United States Patent [19]

Myer

[11] 3,878,542

[45] Apr. 15, 1975

[54] MOVABLE MAGNETIC DOMAIN RANDOM ACCESS THREE-DIMENSIONAL MEMORY ARRAY

[75] Inventor: Jon H. Myer, Woodland Hills, Calif.

[73] Assignee: Hughes Aircraft Company, Culver City, Calif.

[22] Filed: Apr. 2, 1974

[21] Appl. No.: 457,300

[52] U.S. Cl. .................... 340/174 TF; 340/174 SR; 340/174 NC; 340/174 AC

[51] Int. Cl. .................... G11c 11/14

[58] Field of Search... 340/174 TF, 174 SR, 174 AC, 340/174 NC

[56] References Cited

UNITED STATES PATENTS

| | | | |
|---|---|---|---|
| 3,487,384 | 12/1969 | Nelson | 340/174 AC |
| 3,500,360 | 3/1970 | Cassidy | 340/174 AC |
| 3,513,452 | 5/1970 | Bobeck et al. | 340/174 TF |

*Primary Examiner*—Stanley M. Urynowicz, Jr.
*Attorney, Agent, or Firm*—W. H. MacAllister, Jr.; Donald C. Keaveney

[57] ABSTRACT

There is disclosed a random access memory device wherein binary bits of information are stored by moving mobile cylindrical magnetic domains in anisotropic ferromagnetic crystal platelets between positions predetermined in the platelets by appropriate drive circuitry conductor configurations which generate suitable magnetic fields for positioning and moving the cylindrical magnetic domains. The device contemplates a three input or three ordinate address memory which may take the form of a three dimensional stack of crystal platelets sandwiched between substrates on which the appropriate conductor patterns are deposited. Provision is made for an enable or inhibit function as well as for a magnetoresistive sensing conductor for each crystal while yet keeping the necessary conductor configurations at a level of simplicity such that no insulated crossovers are necessary on any single array. The two arrays of each single crystal platelet provide for both read and write functions in that single platelet.

5 Claims, 12 Drawing Figures

MOVABLE MAGNETIC DOMAIN RANDOM ACCESS THREE-DIMENSIONAL MEMORY ARRAY

CROSS REFERENCE TO RELATED APPLICATIONS

This invention is an improvement over the inventions described in my earlier filed applications, Ser. No. 205,095, filed Dec. 6, 1971, now U.S. Pat. No. 3,806,903, entitled "Magneto-Optical Devices," and Ser. No. 242,474, filed Apr. 10, 1972, now U.S. Pat. No. 3,806,899 entitled "Magneto Resistive Read-Out for Domain Addressing Interrogator," both of which are assigned to the Hughes Aircraft Company as is the present application.

BACKGROUND OF THE INVENTION

This invention relates to random access memories and particularly to a memory array for the storage of digital information wherein each binary bit location has three location defining coordinates and is thus addressable by three input signals for either the read or write functions. The array may, for example, comprise a stack of uniaxial anisotropic ferromagnetic crystal platelets, each of which is capable of sustaining mobile cylindrical magnetic domains commonly referred to as "magnetic bubbles." The invention further relates to conductor pattern arrays particularly suited for positioning such a bubble in one or another subportion of each bit location in each plane or platelet and for interrogating any given bit location to determine whether a bubble has been positioned in a portion thereof to represent a binary 1 or a binary 0.

Such devices are particularly useful in providing an orthogonal or random access high speed non-destructive read-out memory. The devices disclosed in the earlier applications provided for various means of sensing the location of a bubble at one of two possible positions at each bit location in a single crystal platelet, and disclosed a particular drive conductor configuration uniquely suited for this purpose. These devices contemplated use of separate interrogating or read-out means such as a second crystal platelet positioned adjacent to the first.

It is a purpose of the present invention to provide an improved conductor array pattern which will facilitate moving the single bubble between any one of three bit positions at a single bit location in such a platelet in order to permit a read-out from a single platelet. Such an arrangement has been attempted in the prior art as shown, for example, in U.S. Pat. No. 3,513,452 to A. H. Bobeck et al. It is a specific purpose of the present invention, however, to provide such a three position per bit arrangement wherein the bubble position is controlled entirely by the magnetic fields generated by the conductor arrays and wherein it is not necessary to have electrical crossover of any two conductors in either the set of conductors providing the first input coordinate signal or in the set of conductors providing the second input coordinate signal in a platelet using two sets of normally orthogonal conductors to provide a two coordinate address array. It is a further purpose or object of this invention to provide both a read-out conductor and an inhibit-enable conductor in such an array without introducing crossovers within the sets so that the two coordinate address array can be expanded to a three coordinate address array which is typically embodied in a three dimensional attack of crystal platelets the logic of which is such that any two coordinate address within any pre-selected one of the crystal platelets can be selected for either the write or read function to provide a three ordinate address memory. In such a three dimensional stack of crystal platelets considerable advantage both in simplifying quality control and reliability and in increasing the density or packing of number of bits per cubic centimeter results from a conductor array pattern which provides all the necessary functions without requiring electrical crossover within a given plane which in turn would require an insulating layer or step between the conductors.

SUMMARY OF THE INVENTION

These and other purposes, objects and advantages are achieved by providing a plurality of suitable crystal platelets of the type described above, each of which has associated with it two insulating substrates such as glass plates, each of which is provided with a conductor array and one of which is placed adjacent each of the opposite major plane surfaces of the crystal platelet. The set of conductors on one glass plate run generally parallel to each other in a first direction whereas as the set of conductors on the second glass plate also run generally parallel to each other in a second direction which may typically be orthogonal to the first. The area of the crystal platelet sandwiched between the two glass plates at which the appropriate number (2 or 3) of conductors of each set "cross" each other on opposite surfaces of the crystal platelet defines a single bit location within each platelet. If only a single platelet is to be used, two conductors or a pair of conductors in each set are sufficient to define a three position bit location at each intersection assuming independent read-out means are used. In a three-dimensional array it is preferred to add a third conductor to each pair for each bit location, the third conductor in one of the arrays being configured to provide a generalized inhibit-enable signal for all of the bit locations in any one crystal platelet whereas the third conductor in the other set of conductors on the other glass substrate provides a read-out sensing line. In such an arrangement an actual three dimensional stack is preferred but is not necessary since the plurality of platelet sandwiches can be arranged in any desired geometrical configuration.

BRIEF DESCRIPTION OF THE DRAWINGS

These and other objects and advantages will be more fully apparent from the description below, taken in conjunction with the accompanying drawings wherein like reference characters refer to like parts throughout and in which.

DETAILED DESCRIPTION OF THE INVENTION

Figure 1:
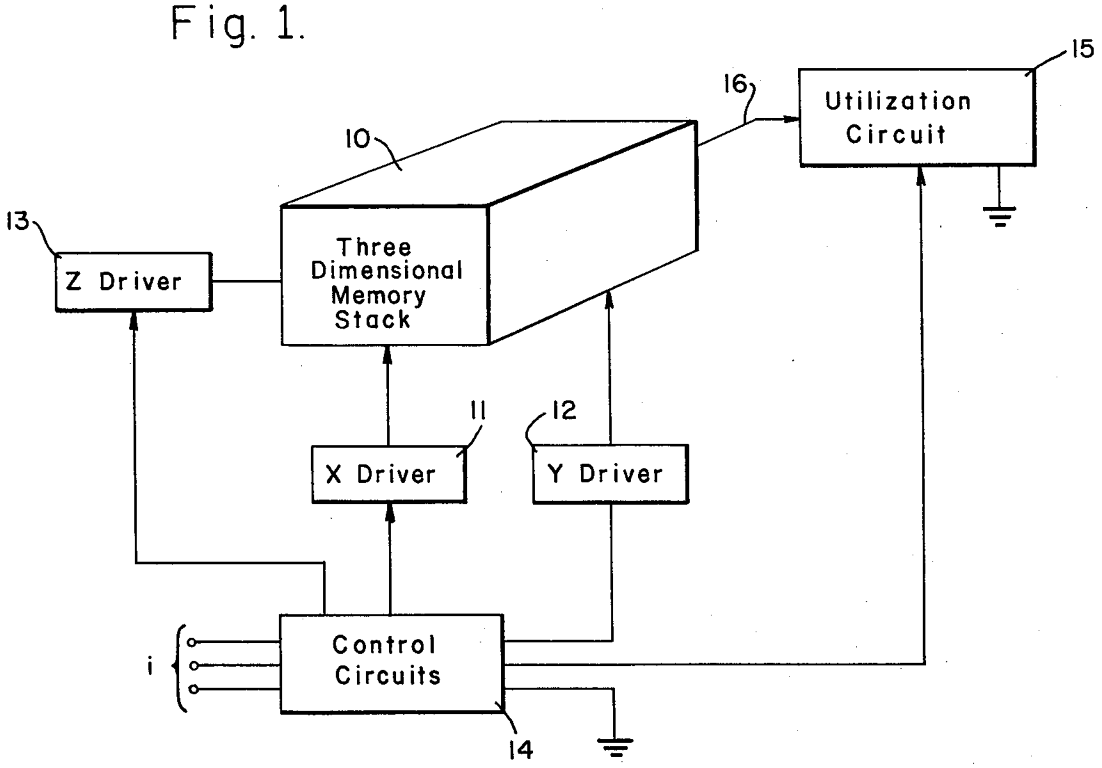
FIG. 1 is a schematic block diagram of a memory system in accordance with the present invention.
Figure 2:
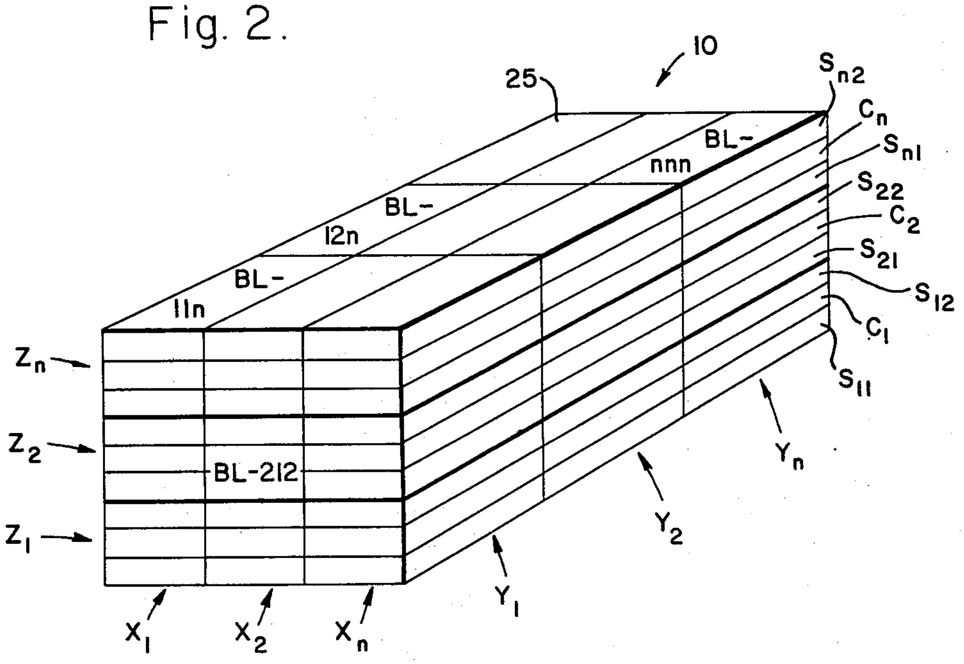
FIG. 2 is a perspective view of a stack of crystal platelets each sandwiched between a pair of drive conductor supporting insulating substrates used to form the three dimensional memory stack in the system of FIG. 1.

Turning now to the drawing there is shown in FIG. 1 a schematic block diagram illustrating the type of system in which the circuitry and device of the present invention may be used. A three dimentional memory stack or array 10 is provided with X driver or input circuitry 11, Y driver or input circuitry 12, and Z driver or input circuitry 13. One typical physical embodiment of the memory array or stack 10 is shown without its associated circuitry in FIG. 2. The details of the bubble positioning or drive circuitry used in the stack 10 which are omitted in FIG. 2 are shown in the rest of the drawings whereas the drive circuits 11, 12 and 13 indicated in FIG. 1 are merely conventional logic circuits of the type presently used in ferrite core memories whereby a preselected one of a plurality of possible input circuits in the stack are selected to receive an addressing input signal. The three ordinate or three dimensional input signal, *i*, is applied to control circuit 14 which synchronizes its application to the respective ordinate drive circuits 11, 12 and 13 and which also controls the functioning of and/or transmits the address to any conventional utilization circuit 15 to which the output from the memory array 10 is connected. This output which is applied over conductor 16 is typically an indication of a binary 1 to 0 read-out from the memory location addressed by the input signals *i* or, more generally, a group of such signals in word or other format.

The bubble sustaining memory elements of the array 10 consists of a plurality of crystal platelets such as the platelets C1, C2 . . . C*n*. Each of the crystal platelets has associated with it a pair of insulating substrates such as the glass plates S11 and S12 which are positioned adjacent to the opposite parallel major surfaces of the crystal platelet C1. Similarly, the crystal C2 is sandwiched between glass plates S21 and S22 and, more generally, the crystal Cn is sandwiched between glass plates S*n*1 and S*n*2. Although the conductor arrays to be described below which serve to locate the bubbles in the bit locations can be directly deposited on the surface of the crystal platelets, it is preferred to deposit these conductor arrays on or to etch them into the surface of the glass substrates which are positioned adjacent to the crystal platelets. This is done for quality control and manufacturing efficiency and does not in any way affect the operation of the device.

As shown in FIG. 2 schematically by the dashed lines, the stack of platelets may be regarded as divided into a plurality of binary bit locations in each of the crystal platelet sandwich arrays. The stack illustrated shows a 3x3x3 array which is numbered in each direction as $x_1$, $x_2$. . .$x_n$; $y_1$, $y_2$. . .$y_n$, and $z_1$, $z_2$. . .$z_n$. Thus, bit locations BL–11*n*; BL–12*n* and BL–*nnn* are labeled on the upper surface of the array whereas bit location 212 is labeled at the center of the front surface of the array. It will be noted that each bit location is identified by a three ordinate address.

The crystal platelets C1, C2, Cn are single ferromagnetic crystals in which magneto-crystalline fields align atomic moments in preferred directions to form domains in which the atoms share these preferred orientations. These ferrite crystals (such as yttrium orthoferrite which is in fact the preferred crystal for the device disclosed herein) contain a single preferred magneto-crystal-line direction of magnetization referred to herein as the easy axis and all of the atomic moments in such a crystal will line up either parallel or anti-parallel with it forming these spontaneous intrinsic domains. By slicing the crystal platelet of orthoferrite perpendicular to this easy axis, one obtains an array of randomly spaced serpentine strip domains which, in the presence of a magnetic biasing field of appropriate magnitude, may be reduced to cylindrical domains in the manner described in greater detail in my above noted application, Ser. No. 205,095 and as also described in the literature. These mobile magnetic cylindrical domains are commonly referred to as "bubbles" and may be moved around in the crystal platelets by magnetic driving fields resulting from appropriate driving currents. The possible directions of motion of course lie in the plane of the major surfaces of the crystal platelets.

These cylindrical magnetic domains are moved in the crystal platelets by magnetic fields generated by currents in drive circuit patterns placed on the surfaces of the glass substrates adjacent to the crystal platelets. The patterns are such as to define within the crystal platelets the various bit locations described above in a manner which will be clarified below. It is desirable that the domain bit addressing arrays be simplified by reducing the number of required manufacturing process steps thereby increasing yield and reducing the cost per bit.

This simplification is achieved in the present invention through the use of conductor patterns which are such as to require only two conductor arrays for each crystal platelet in order to perform both the storing and interrogating functions in a single platelet. Each of the arrays is such that no conductor of the set of conductors forming each array crosses any other conductor of the set so that no insulated crossovers are required. The two arrays are mirror image identical and are rotated 90° relative to each other thus requiring only a single photolithographic master pattern. One array is placed on the surface of a glass substrate which is positioned adjacent to one of the major plane surfaces of a given crystal platelet, whereas the other array is placed on the surface of a second insulating glass substrate which is placed adjacent to the opposite parallel major plane surface of the same crystal platelet. The simplest embodiment of one typical array suitable for this purpose is shown for the X direction while is positioned on the first substrate in FIG. 3 and in FIG. 4 for the Y direction (rotated 90°) which is positioned on the second substrate. This simplest embodiment contemplates a single crystal platelet using optical or any other suitable read-out not requiring a separate conductor in the array and not including an enable-inhibit function in the array. The device would thus be a two ordinate or X–Y input memory.

Figure 3:
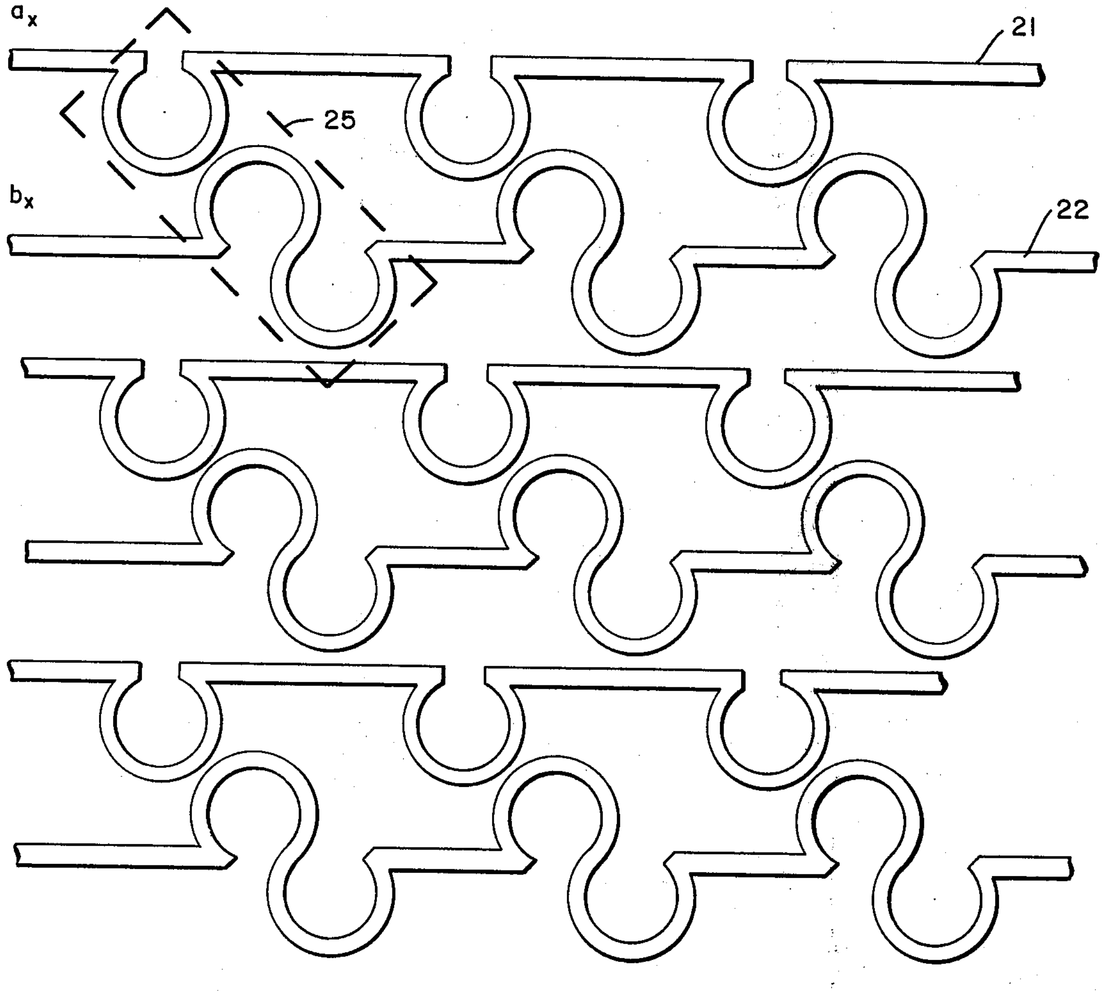
FIGS. 3 and 4 respectively are plan views of the X direction and Y direction conductor arrays suitable for use with a single crystal platelet memory of the type disclosed herein.
Figure 4:
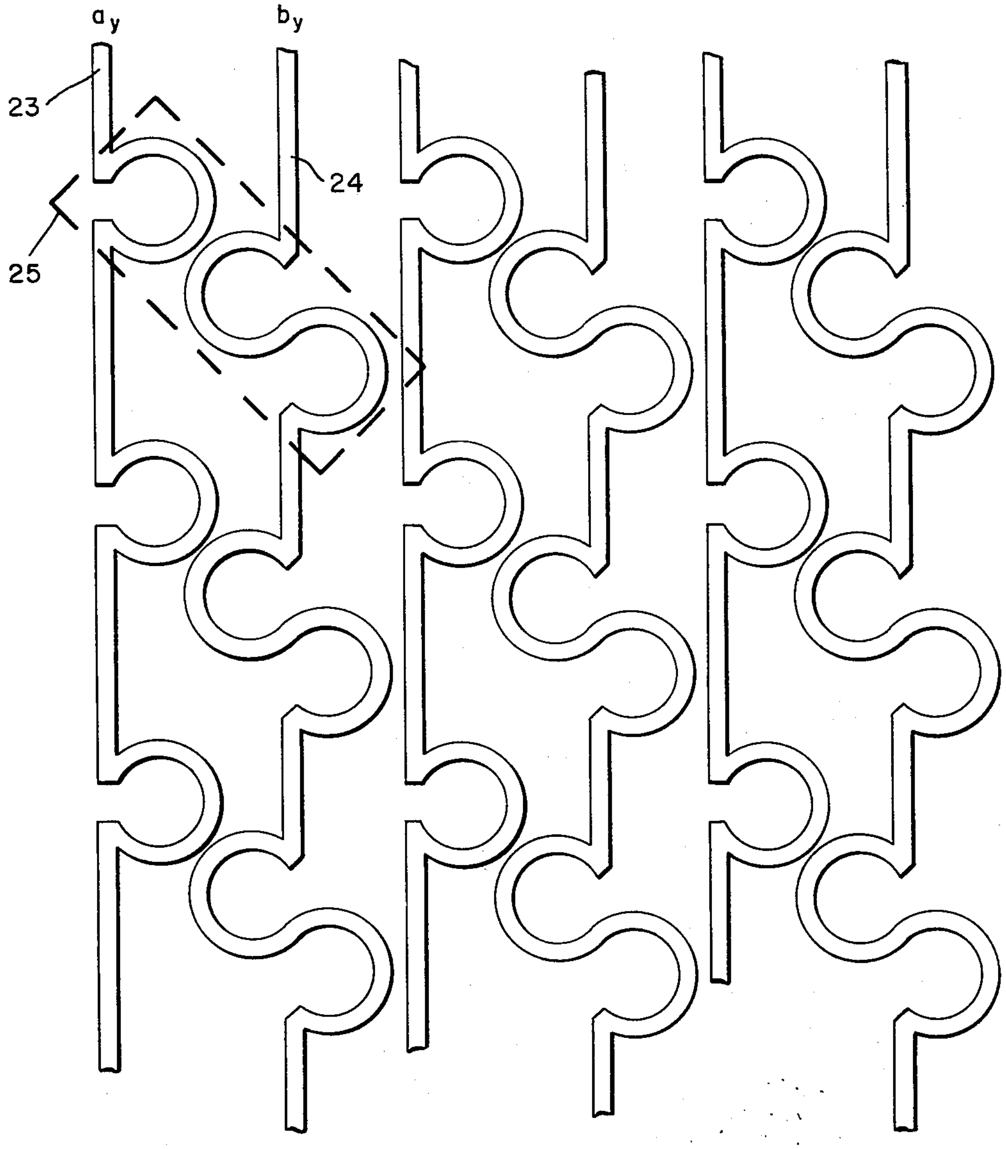

As shown in FIGS. 3 and 4, one conductor of each pair of conductors in each of the sets of conductors shown respectively in FIGS. 3 and 4 is of the double reversing loop or figure eight configuration illustrated by conductor 22 in the X array shown in FIG. 3 and conductor 24 in the Y array shown in FIG. 4. This conductor configuration was used by itself in my earlier application, Ser. No. 205,095 to form a two position bit location. That arrangement, however, requires two X–Y arrays or four conductor arrays per platelet in order to achieve an interrogating function using two positions per bit location and a separate interrogating crystal. It is herein preferred to provide three positions per bit location and to thereby eliminate two of the four sets of conductors without introducing conductor crossovers by providing a third conductor such as the conductor 21 in FIG. 3 and the conductor 23 in FIG. 4 which has at each bit location a single loop of the general size and shape of the bubble to be retained and which is equivalent to half of the double loop in the conductor 22. This single loop at each bit location is positioned as may be seen in the drawings so that the bubble may be moved in a straight line which is defined by the three centers of the three loops comprising the two loops of the figure eight in conductor 22 and the single loop in conductor 21. That is to say, these loops are so positioned with respect to each other that their centers lie on a straight line along which the bubble may be moved by fields generated by appropriate current in these conductors in a manner shown in greater detail in FIGS. 5, 6 and 7.

One bit location 25 in the 3x3 bit array shown in FIGS. 3 and 4 thus comprises the three circular conductor loops which are addressed by currents $a_x$ in conductor 21 and $b_x$ in conductor 22 of the X array and by currents $a_y$ in conductor 23 and $b_y$ in conductor 24 of the Y array. These currents in the X and Y arrays cooperate in moving the bubble in the interlaminated crystal platelets since, as noted above, the arrays are deposited on the opposed faces of the glass substrates between which the crystal platelet is sandwiched.

Figure 5:
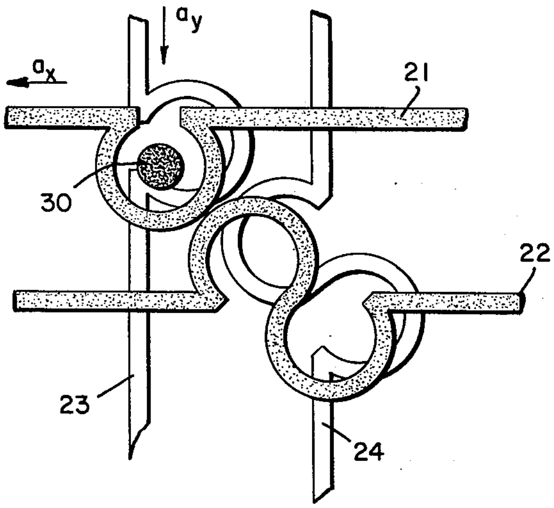
FIGS. 5, 6 and 7 are diagramatic views illustrating the movement of cylindrical bubble between three positions at a bit location under the influence of currents in the conductors shown in FIGS. 3 and 4 which intersect at a given bit location.
Figure 6:
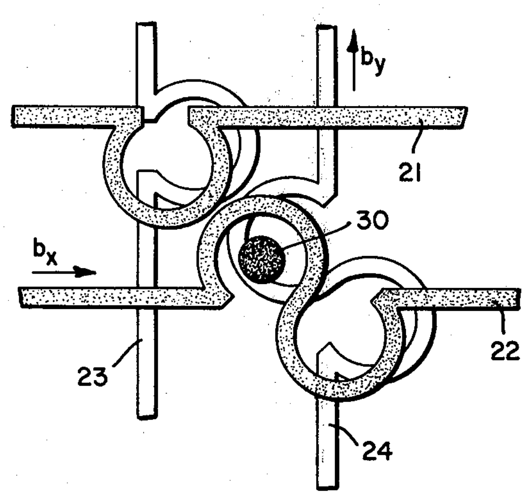
Figure 7:
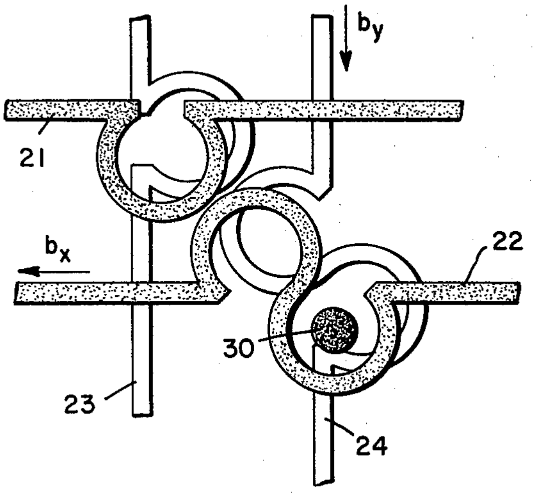

FIGS. 5, 6 and 7 show the three possible bubble positions and the currents required from the drive circuits to move the bubble in them. In these illustrations, both the X and Y arrays are shown superimposed since the arrays are positioned in magnetic coating relationship with each other and with the crystal platelet sandwiched between them in the sense that their fields add or subtract vectorially and the net field acts on the field of the bubble by well known magnetic laws to cause its motion. The two arrays are shown slightly displaced merely for clarity of illustration and of course it will be understood that in practice they are exactly superimposed. In the drawing the X array is shaded in FIGS. 5, 6 and 7.

The possible positions of the bubble 30 and the currents in the conductors 21 and 22 necessary to move it to any one of the positions in bit location 25 are shown in FIGS. 5, 6 and 7 respectively. It will be noted in FIG. 5 that the singular X and Y loops in conductors 21 and 23 respectively are energized by currents $a_x$ and $a_y$ having the directions shown by the arrows in order to move the bubble into the position defined by the singular loops which for convenience is referred to as the "0 stored" position. It will be noted from FIG. 6 that energizing the X and Y double loops in conductors 22 and 24 respectively with the currents $b_x$ and $b_y$ having the polarities or directions shown by the arrows transfers the bubble 30 to the central or "1 stored" position. A reverse current pulse in the $a_x$ and $a_y$ conductors is used to aid in the transfer by repelling the bubble out of the " 0 stored" position. It will of course be understood that these current pulses are provided by the driver circuits under the management of the control circuit as shown in the schematic diagram of FIG. 1.

Finally, in FIG. 7 there is shown the current configuration necessary to move the bubble 30 to the "interrogate and read 1" position which has been arbitrarily selected as the position at the lower right of the drawing. Reversal of the direction of the currents $b_x$ and $b_y$ in the conductors 22 and 24 from the direction shown in FIG. 6 to that shown in FIG. 7 transfers the bubble to this read position. This is referred to as the "read 1 position" since if the bubble is not in the 1 position no transfer will occur; thus when the appropriate currents are applied and do not produce a transfer it may be concluded that the bubble is in the "stored 0" position shown in FIG. 5 so that the bit location is read as storing a 0 by the absence of a bubble in the read position when appropriate interrogate pulses are applied. The transfer of the bubbles 30 to the read position may be detected by any conventional read-out means such as a beam of polarized light going through the read position the polarization of which is changed by the presence of the bubble, or by magneto-resistive means in a manner which will be shown in greater detail below. In a preferred mode of operation a bipolar pulse is applied to the $b_x$ and $b_y$ conductors transferring the bubble only temporarily to the read 1 position and returning it immediately to the store 1 position as shown in FIG. 6 so that the interrogation operation is nondestructive of the memory content.

Figure 8:
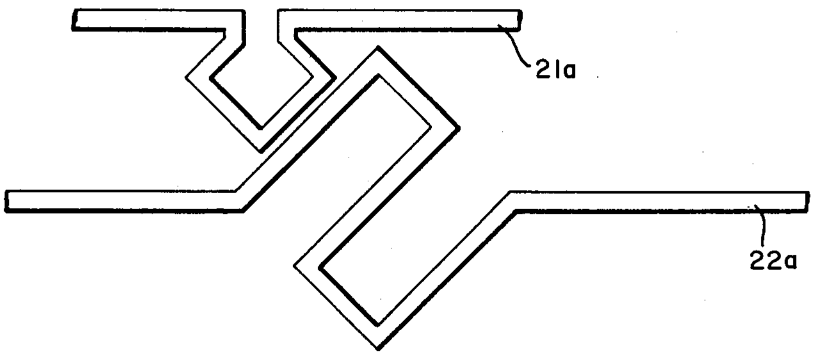
FIGS. 8 and 9 are alternate conductor configurations.
Figure 9:
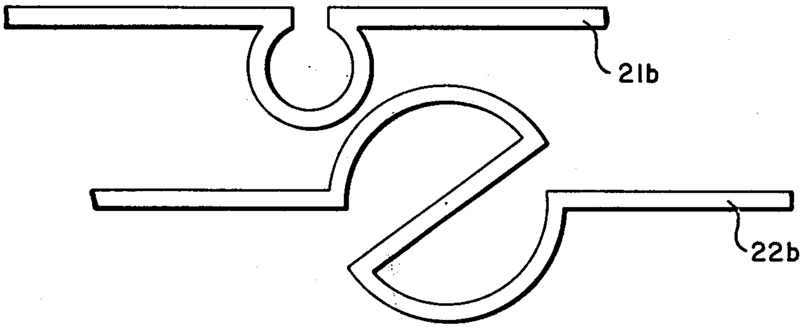

Alternate embodiments of the invention are apparent. For example, the roles of the three conductor loops can be reversed, any suitable bubble sensing technique can be employed and alternate conductor loop shapes can be used. Two possible alternate shapes are shown by way of example in FIGS. 8 and 9. In FIG. 8 the generally curving loops are replaced by rectangular shapes as shown for conductors 21*a* and 22*a* corresponding to the conductors 21 and 22 in the earlier figures. In FIG. 9 loops of differing sizes are illustrated in conductors 21*b* and 22*b* corresponding to conductors 21 and 22 of earlier figures. Whatever the particular loop configuration may be, this simple, parallel, random or content addressable memory cell array meets all the requirements of simplicity outlined above and uses only one bubble carrier crystal platelet for each two juxtaposed conductor arrays. For each such crystal platelet this memory requires $2+4\sqrt{n}$ terminals where n is the number of stored bits or bit locations which is 9 in the figures as illustrated. For a 9 bit location array, 14 terminals are required. This may be seen when it is realized that for a 3×3 bit array there are six X conductors and six Y conductors, each of which are returned to a common or ground at one end of each set. Hence, the 6X conductors and their common ground total 7 and the 6Y conductors and their common ground total an additional 7 making the 14 terminals connections required. These terminal connections are not shown in FIG. 2, but would of course be made to any suitable terminal strip surrounding the physical stack of platelets shown therein. Additionally, a permanent magnetic biasing means is contemplated for the memory stack 2 which may, for example, comprise a permanent ring magnet surrounding the stack. Where this biasing magnet is made of electrically insulating material, it may also serve as the insulating terminal strip.

In order to be able to use this memory device in three dimensional stacks, it is necessary to provide for the selective addressability of individual memory planes wherein each plane comprises a crystal platelet sandwiched between two insulating substrates containing the conductor arrays discussed. Of course, two adjacent substrates may be combined, but manufacturing techniques indicate that it is preferred to sacrifice the saving in stack space for the greater quality control inherent in separate substrates.

In the device described above, selective recording or reading of 0's and 1's is accomplished by passing half currents (half the amount required for switching) through each of the X and Y arrays addressing the chosen bit location. Only that particular bubble will be moved which is near the array intersection where the half currents and fluxes coincide, thus exceeding the residual coercivity of the crystal that inhibits the free bubble movement.

Figure 10:
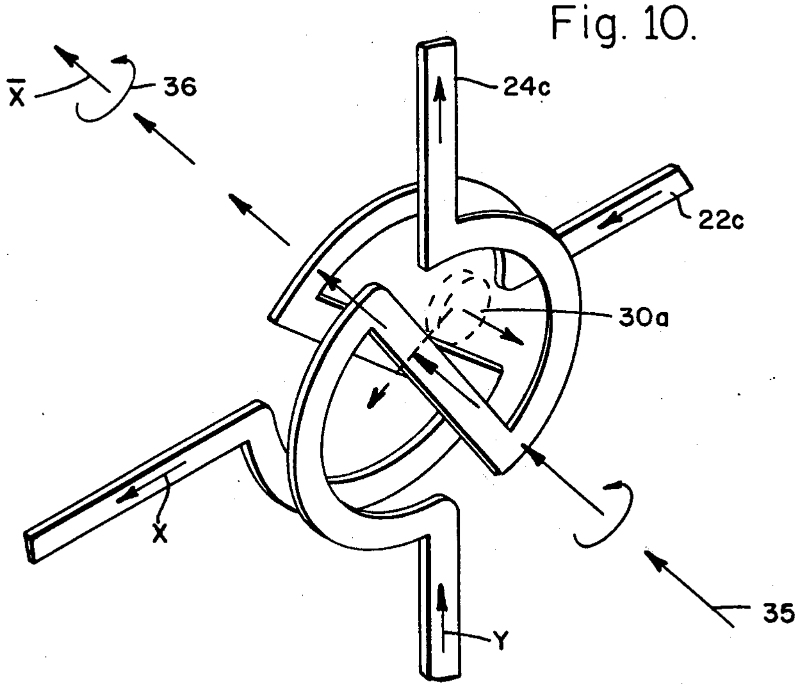
FIG. 10 is a diagramatic view illustrating the manner of operation of an inhibit current in the conductor arrays of the invention.

In order to achieve selective addressability of individual memory planes in a three dimensional stack of planes, it is necessary to add a third magnetically active component to superimpose an enabling or inhibiting action on the bubble transfer. Such a third element permits the selection of one particular intersection or bit location on one particular memory plane out of many intersections on many planes. This is shown schematically in generalized form in FIG. 10. The total magnetomotive force generated by the sum of the two coincident current pulses in the X conductor 22*c* and in the Y conductor 24*c*, is strong enough to propel the bubble 30*a* in the direction 34. A third superimposed coincident current pulse 35 passing over the array generates a flux 36 which counteracts the magnetic displacement force and inhibits the transfer of the bubble. Alternately a current pulse of opposing polarity would generate a flux aiding bubble transfer if the sum of the currents in the X conductor 22*c* and the Y conductor 24*c* are kept below transfer threshold.

Various particularized designs are possible to provide this third enabling or inhibiting current and flux. These may, for example, include a set of straight conductors passing the current 35 diagonally over the center and parallel to the array diagonals but electrically isolated from them; by being placed on the obverse side of the insulating glass plate, or it may include an additional X or Y current carrying conductor combined in generally side-by-side relation with each pair of conductors in either set of conductors in the type of configuration illustrated above, wherein each of these third conductors is connected in parallel or series to the terminal strip with all other like conductors in its plane so that a single input either enables or inhibits (depending upon sense or polarity) the transfer of bubbles in the entire memory plane. Such an arrangement is shown by way of example in the specific arrangements described below together with a particular specific read-out means suitable for use in three dimensional arrays.

Figure 11:
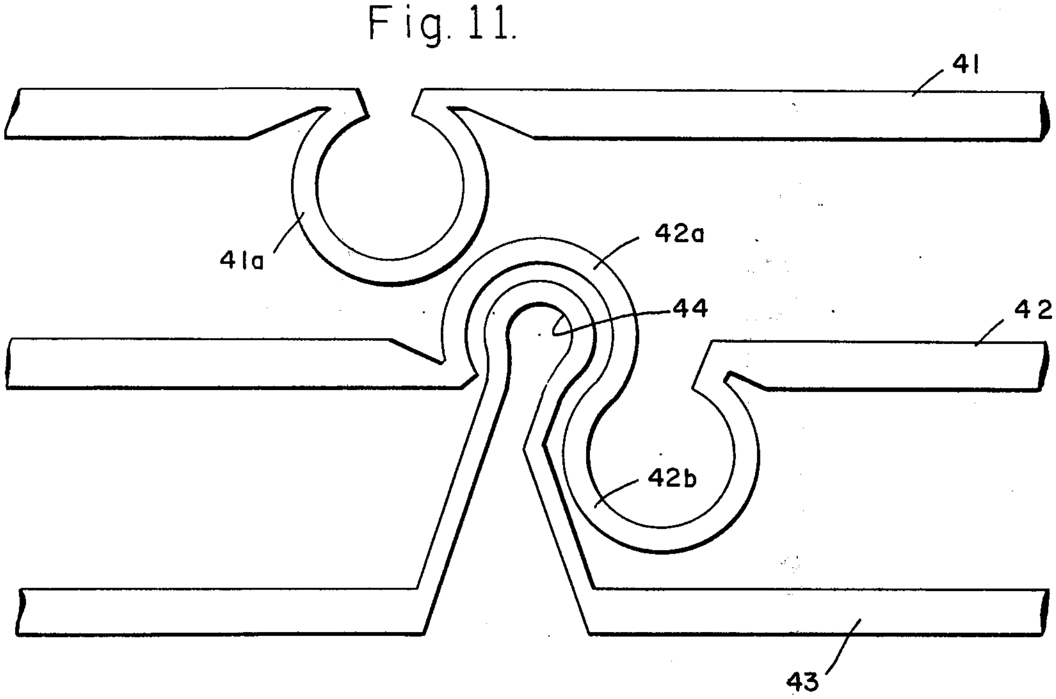
FIGS. 11 and 12 are plan views of the configuration of the conductor arrays at a given bit location for a three input or three ordinate address memory of the type shown in FIGS. 1 and 2.
Figure 12:
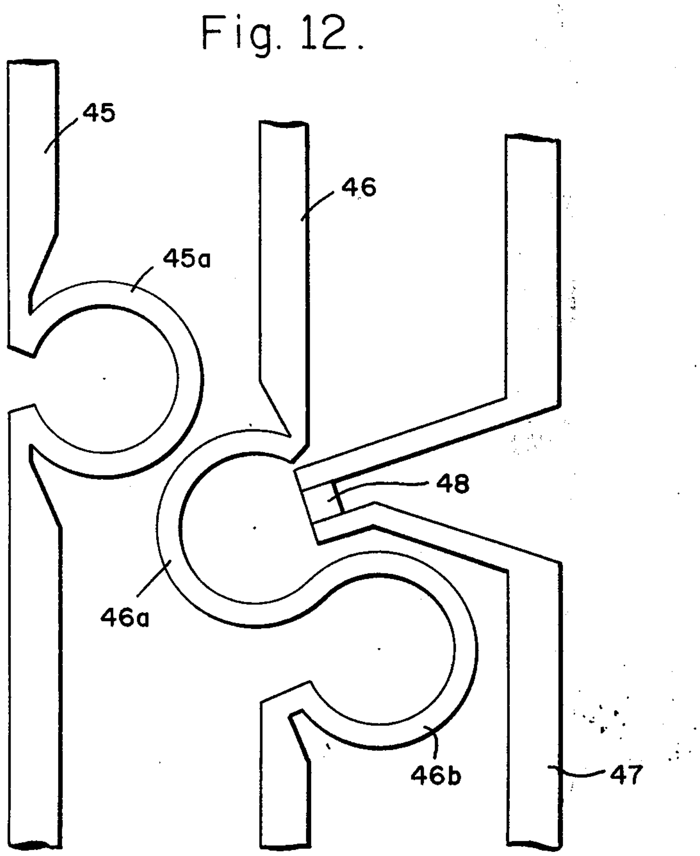

In FIGS. 11 and 12, there are respectively shown the pattern for the X direction and the pattern for the Y direction of a configuration wherein the pair of conductors which intersect to define a bit location in the previous embodiments is increased to a triad or three conductors, which intersect to define each bit location. In this bit location defining array the third conductor in the X direction is used to provide the enable-inhibit signal, whereas the third conductor in the Y direction is used to provide magnetoresistive output sensing of a type which operates on the general principles disclosed in my above noted copending application, Ser. No. 242,474, but which does not require two opposed crystal platelets for sensing as will be seen below.

In FIGS. 11 and 12, the conductors 41 and 42 perform the same function that conductors 21 and 22 shown in FIG. 3 perform, whereas the conductors 45 and 46 of FIG. 12 perform the same function that conductors 23 and 24 of FIG. 4 perform. These conductors are thus designed to transfer the bubble at each bit location between any one of the three positions at that location in the manner described above. The conductor 43 in FIG. 11 performs the same function that conductor 35 of FIG. 10 performed in that it will either inhibit or enable the transfer of the bubble, depending upon the relative magnitudes and polarities of the currents in conductors 42 and 43 respectively. It will be noted that conductor 43 includes a loop portion 44 which is smaller than the loop portion 42a of conductor 42 and is nestled within it. One arm of loop 44 also passes in a parallel relationship to a portion of the loop 42b of conductor 42, which forms the center line between the two bubble positions. Thus, when the currents in conductors 42 and 43 have the same direction they are in aiding or enabling relationship, whereas when they have opposite polarities or directions they are in cancelling or inhibiting relationships provided they have relatively the same magnitudes. The conductor 43 at each bit location, thus serves to provide either an enable or inhibit function depending upon the polarity of the current applied to it by the drive circuit. Each of the conductors corresponding to conductor 43 in any given set of conductors is, of course, connected in parallel or series with all other enable conductors in the plane of any one given crystal platelet so that a signal applied to a selected plane may serve as the third input to the three ordinate address memory system illustrated in FIGS. 1 and 2.

It is of course contemplated that for an "enable" function each of the currents in conductors 42 and 43 will be slightly less than the "half currents" used above. For example, each may be "quarter currents" in magnitude so that only the plane in which they are in aiding relationship or like polarity will have the necessary half current from their sum. Assuming independent addressability is the X and Y coordinates, there are thus two alternate methods of isolating the Z coordinate of the desired bit.

In the first or enable method we energize all the desired X and Y coordinates with coincident current pulses which in additive combination generate a field gradient that is too weak to propel the bubble bits at all the possible X–Y intersections on all the platelets. By adding a third aiding coincident current pulse through the desired Z coordinate, we provide the required additional flux to transfer the bit. The Z conductors are parallel to, say, the X conductors and perform the function of enabling one whole selected platelet during the interrogation cycle. The current pulse levels are chosen so that two out of three coincident axes cannot transfer a bit by themselves.

In the second or inhibit method we again energize all the desired X and Y coordinates with coincident current pulses, but now the two current levels are chosen to suffice by themselves and therefore would transfer bubble bits in all platelets or all Z levels at this particular X and Y coordinate. To select the desired Z platelet the third conductor is energized with a coincident inhibit pulse of opposite polarity to that used in its parallel conductor as shown in FIG. 11 in the X direction. THIS IS DONE IN ALL Z PLATELETS EXCEPT THE ADDRESSED ONE. In this manner a unique address can be selected by the three coordinate input signals.

In order to obtain magneto resistive read-out from such a three dimensional array, it is preferred to use the third conductor or triad spacing shown in FIG. 12 wherein the space corresponding to that occupied by the enable conductor 43 in the X array is occupied in the Y array by the conductor 47, having a magneto resistive sensing element 48 positioned in the gap of the loop 46*a* of conductor 46. Conductors 47 in the Y set are brought out to conductor 16 for particularized bit location read-out in a manner to be discussed below.

It will be noted that the single loop conductor 45 of FIG. 12 is the mirror image of conductor 41 rotated by 90°, whereas the double loop conductor 46 of FIG. 12 is the mirror image of drive conductor 42 rotated by 90°.

In FIG. 11 conductor 41 feeds loop 41*a* which provides the store 0 of the underlying bubble. Conductor 42 feeds the reversing loop having portions 42*a* and 42*b*, which provides the store 1 and the interrogate 1 positions of the bubble. Conductor 43, as noted above provides the enable or inhibit function.

In FIG. 12 conductor 45 feeds the single loop 45*a* which provides the other drive circuit for the store 0 position. conductor 46 feeds the two loops 46*a* and 46*b* of the reversing loop at each bit location. Loop 46*a* provides the other half of the drive circuitry for the store 1 position, whereas loop 46*b* provides the other half of the drive circuitry for the interrogate position. Conductor 47 is attached to the magneto resistive sensor 48 and detects the presence or absence of a bubble in the 1 position. Direct magnetic flux coupling between the conductor driving loop and the magneto resistive sensor is minimized by locating the sensor in the gap in the loop 46*a*.

In operation, the bipolar "half current" pulse in the conductor 46 and quarter current pulses in conductors 42 and 43 transfers a bubble stored at the 1 position under loop 46a to the interrogate position under loop 46b and returns it. The conductor arrays are so interconnected that a three ordinate input signal supplies current only to the specified X and Y conductors of every Z plane and supplies current to all of the enable-inhibit conductors of the specified Z plane.

The bubble excursion to the read portion is sensed by the magneto-resistor sensor 48 which is part of a series string of all magneto-resistor sensors contained in this particular Y matrix. Only one sensor is needed for each matrix element, since the address of the interrogated bubble is given by the coordinates of the bipolar interrogating pulse which are supplied by the control circuits 14 not only to the drive circuits but also to the utilization circuit. To enhance the output signal of the string of magneto-resistor sensors due to transfer of a bubble it is desirable to subdivide the sensor string into groups and detect the transfer site either by sequential scanning or by parallel comparison.

This arrangement thus makes possible the use of the third conductor position in the X array for the enable or inhibit function described above. If such a function is not desired, this position in the X array may alternatively be used as a redundant detector array for increased reliability.

Of course, it is possible to insert separate sense amplifiers into each column and row of magnetoresistors and thus detect the location of a bubble independently of the interrogating pulse coordinates. However, such a scheme would be very costly due to the number of sense amplifiers required. A typical simple fabrication process for the array illustrated in FIGS. 11 and 12 consist of depositing a 250 angstrom thick permalloy magneto-resistor film layer over the whole insulating substrate of one of the glass plates. This layer also serves as a bond between the heavy conductor gold layer deposited to form a drive conductor and the substrate. Next, the negative photoresist pattern of all conductors is formed and gold is evaporated and plated through the resultant photoresist apertures. The undesired permalloy material remaining is then etched. Thus, very few process steps are needed for the manufacture of this device which can be produced economically and reliably.

There is thus provided a three ordinate input signal addressable random access non-destructive read-out memory device wherein each crystal platelet of a three dimensional stack of platelets requires only two conductor array or sets in order to provide both the read and write functions for each bit location in the crystal platelet and in which the reliability, economy and density of packing of the memory are increased by the fact that no two conductors of any set cross each other thereby eliminating the need for insulated crossovers.

What is claimed is:

1. In a random access memory device of the type utilizing cylindrical magnetic domains movable in a plane parallel to a major surface of at least one crystal platelet and having a domain positioning magnetic field generating array of electrical conductors positioned in magnetic field coupled relationship to said crystal platelet to define therein an array of binary bit memory locations each of which can store a representation of a binary zero or a binary one, as represented by a selected positioning of one of said movable magnetic domains at a particular portion of said bit location, the improvement comprising:

a. a first set of electrical conductors comprising a plurality of pairs of conductors all extending in spaced parallel relationship to each other in a first direction in a first plane at one major surface of said crystal platelet;

b. a second set of electrical conductors comprising a plurality of pairs of conductors all extending in spaced parallel relationship to each other in a second direction different from said first direction in a second plane at the major surface of said crystal platelet which is opposite and parallel to said first major surface thereof, one pair of each of said sets of conductors being positioned in magnetic coacting relationship with each of said bit locations and with the pair of conductors in the other set which is positioned to magnetically coact with the same bit location;

c. one conductor of each of said pairs of conductors in each of said sets having at each bit location a reversing double loop portion configured to retain in association with each of said loops at least one of said movable domains with the magnetic field generated by electrical current flowing in a continuous path through each of said loops, said loops at each of said bit locations being connected to the loop of at least one adjacent bit location by at least one straight conductor run which provides with said loops a single continuous path for flow of current and which does not cross any other conductor in its set;

d. the other conductor of each of said pairs of conductors of each of said set having at each of said bit locations a single loop portion configured to retain in association therewith at least one of said movable domains within the magnetic field generated by an electrical current flowing in a continuous path through said loop, said loop at each of said bit locations being connected to the corresponding loop of at least one adjacent bit location by at least one straight conductor run which provides with said loops a single continuous path for flow of current in each of said conductors and which does not cross any other conductor in its set of conductors;

e. each conductor of each of said pairs of conductors being positioned with respect to the other member of said pair of that a single loop of one conductor of the pair and a double loop of the other conductor of a pair are positioned adjacent to each other in each bit location to define three contiguous domain retaining portions of said bit location between which said movable domain may be moved by currents in said conductor arrays, one of said locations representing a stored binary one, a second of said locations representing a stored binary zero, and the third of said locations providing a readout position; and f. means to supply a drive current to any preselected one of each set of conductors to provide a two ordinate addressable binary memory.

2. A device as in claim 1 wherein a third conductor is associated with each pair of conductors in one of said sets of conductors, each of said third conductors including a magnetoresistive element at each bit location positioned to sense the presence or absence of a bubble at a predetermined portion of said bit location.

3. A device as in claim 1 wherein a third conductor is associated with each pair of conductors in one of said sets of conductors and extends in a direction generally parallel to said pair, said third conductor being configured to provide an inhibit-enable function with respect to the movement of the magnetic domain at any bit location by currents in any of the pairs of conductors in said set of conductors in response to a current in said third conductor; and means to provide said current to said third conductor.

4. A device as in claim 2 wherein a third conductor is associated with each pair of conductors in the other of said sets of conductors and extends in a direction generally parallel to said pair, said third conductor being configured to provide an inhibit-enable function with respect to the movement of the magnetic domain at any bit location by currents in any of the pairs of conductors in said set of conductors in respsonse to a current in said third conductor; and means to provide said current to said third conductor.

5. A three ordinate addressable random access binary memory array comprising:

a. a plurality of devices as defined in claim 4 and further including;

b. means to preselect which of said third inhibit-enable conductors is to be activated by said means to provide current thereto.

* * * * *